United States Patent
Ger et al.

(10) Patent No.: US 8,242,628 B2
(45) Date of Patent: Aug. 14, 2012

(54) POWER SUPPLY DEVICE WITH LOW STANDBY POWER CONSUMPTION

(75) Inventors: Chih-Chan Ger, Jhongli (TW);
Chih-Chang Chang, Jhongli (TW);
Chia-Kun Chen, Jhongli (TW)

(73) Assignee: Ampower Technology Co., Ltd., Jhongli, Taoyuan County (TW)

( * ) Notice: Subject to any disclaimer, the term of this patent is extended or adjusted under 35 U.S.C. 154(b) by 400 days.

(21) Appl. No.: 12/541,669

(22) Filed: Aug. 14, 2009

(65) Prior Publication Data

US 2010/0123351 A1  May 20, 2010

(30) Foreign Application Priority Data

Nov. 14, 2008  (TW) ................................ 97144144 A

(51) Int. Cl.
*H02J 3/00* (2006.01)
*H02J 3/22* (2006.01)

(52) U.S. Cl. ............................................ 307/17; 363/15
(58) Field of Classification Search .................... 363/15, 363/21.01, 21.1, 21.04; 307/17
See application file for complete search history.

(56) References Cited

U.S. PATENT DOCUMENTS 6,967,851 B2 * 11/2005 Yang et al. ........................ 363/16
2010/0110730 A1 * 5/2010 Ger et al. ......................... 363/15

* cited by examiner

*Primary Examiner* — Michael Rutland Wallis
(74) *Attorney, Agent, or Firm* — Altis Law Group, Inc.

(57) ABSTRACT

A power device transforms input power into power for output, and includes an input unit, a power factor unit, a first electronic switch, an output unit, and a control signal port. The power factor unit includes a power factor correction circuit and a first detection circuit connected to an output end of the power factor unit and the power factor correction circuit. The first electronic switch is connected to the first detection circuit, and is under control of the control signal port.

18 Claims, 3 Drawing Sheets

POWER SUPPLY DEVICE WITH LOW
STANDBY POWER CONSUMPTION

BACKGROUND

1. Technical Field

The disclosure relates to power devices, and particularly to a power device with low standby power consumption.

2. Description of Related Art

FIG. 1 is a schematic diagram of a commonly used power device 100. The power device 100 includes an input unit 10, a power factor unit 11, an output unit 12, and a control signal port 13. The power factor unit 11 includes a first detection circuit 115, a second detection circuit 116, and a third detection circuit 117. The output unit 12 includes an output transformer T1 having two secondary windings N2 and two electronic switches 124. The electronic switches 124 are respectively connected between the two secondary windings N2 and two output ports 14 to provide power to loads. The control signal port 13 controls an on/off state of the electronic switches 124.

If the loads enter a sleep state, the power device 100 opens the electronic switches 124 under control of the control signal port 13 to deny power to the loads. However, the three detection circuit 115, 116, and 117 are still connected to input power via the input unit 10, causing power loss.

DETAILED DESCRIPTION

Figure 1:
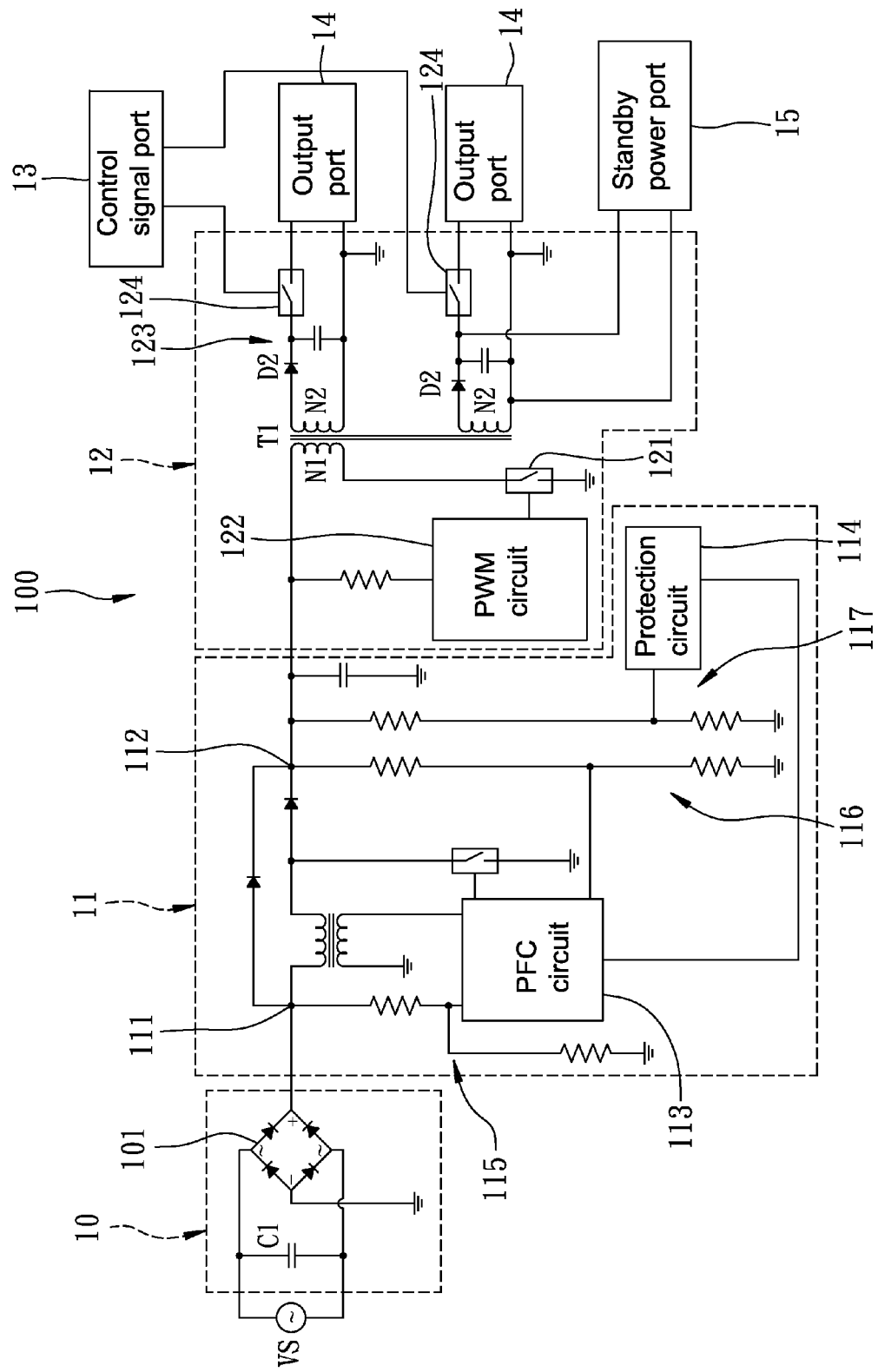
FIG. 1 is a schematic diagram of a commonly used power device.
Figure 2:
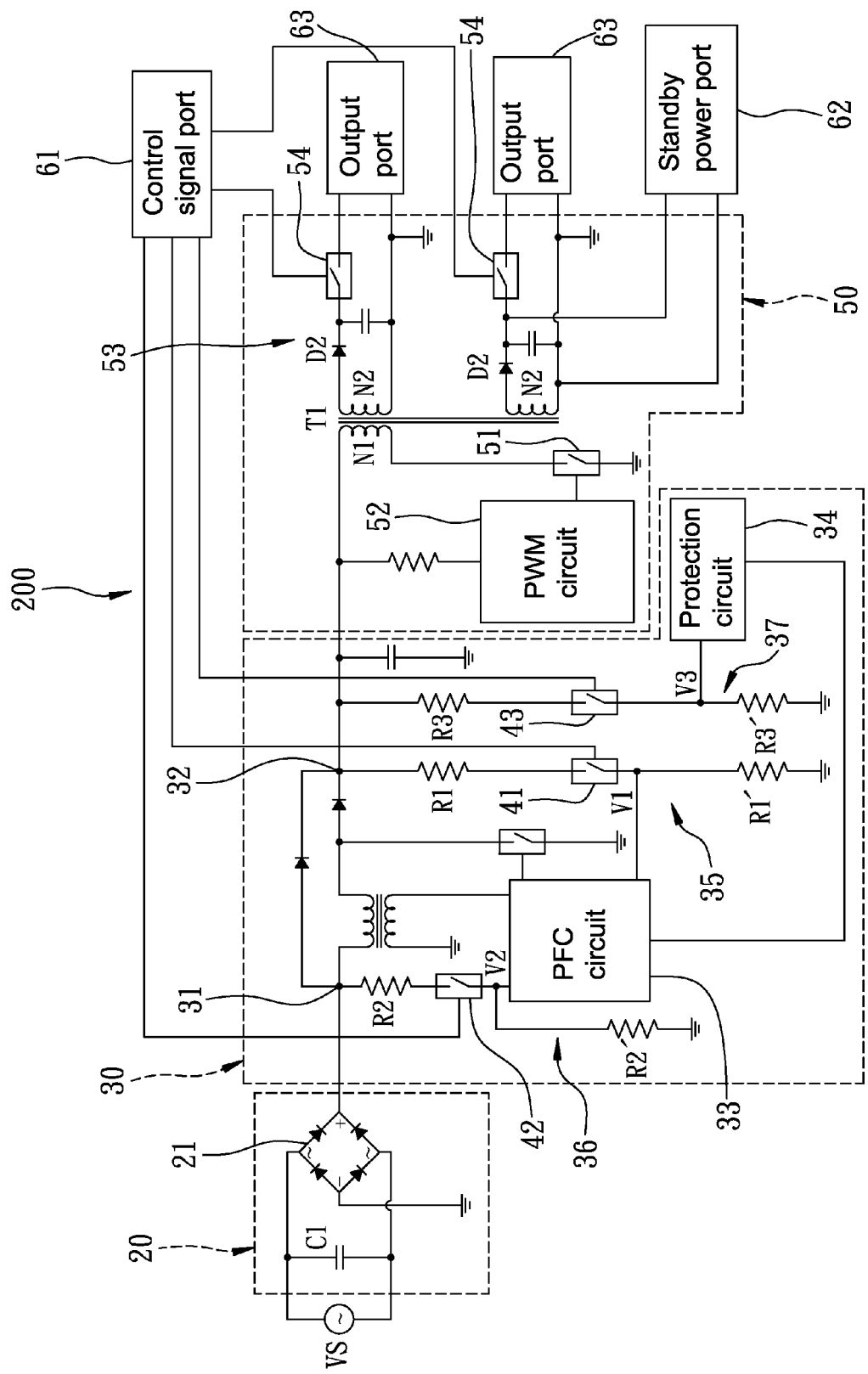
FIG. 2 is a schematic diagram of a first embodiment of a power device as disclosed.

FIG. 2 is a schematic diagram of a first embodiment of a power device 200 as disclosed. The power device 200 transforms input power VS into power for output, and includes an input unit 20, a power factor unit 30, a first electronic switch 41, a second electronic switch 42, a third electronic switch 43, an output unit 50, a control signal port 61, and a standby power port 62. The input unit 20 includes a filter C1 and a first rectifying circuit 21 connected to the filter C1. The input power VS is first filtered by the filter C1, and then rectified by the first rectifying circuit 21. In one embodiment, the filter C1 is a capacitor.

The power factor unit includes an input end 31 to receive rectified power from the first rectifying circuit 21, an output end 32, a power factor correction (PFC) circuit 33, a protection circuit 34, a first detection circuit 35, a second detection circuit 36, and a third detection circuit 37. The first detection circuit 35 is connected to both the output end 32 and the PFC circuit 33. The second detection circuit 36 is connected to both the input end 31 and the PFC circuit 33. The third detection circuit 37 is connected to both the output end 32 and the protection circuit 34.

The first detection circuit 35 includes two first resistors R1 and R1', connected in series between the output end 32 and ground. The PFC circuit 33 retrieves a first detection signal V1 from a node between the two first resistors R1 and R1', and the first detection signal V1 varies according to a voltage change of the output end 32. In one embodiment, the first detection signal V1 may be a voltage signal. It is understood that the first detection signal V1 may also be a current signal.

The second detection circuit 36 includes two second resistors R2 and R2', connected in series between the input end 31 and ground. The PFC circuit 33 retrieves a second detection signal V2 from a node between the two second resistors R2 and R2', and the second detection signal V2 varies according to a voltage change of the input end 31. In one embodiment, the second detection signal V2 may be a voltage signal. It is understood that the second detection signal V2 may also be a current signal. In alternative embodiments, the second detection circuit 36 may be embedded in the PFC circuit 33.

The third detection circuit 37 includes two third resistors R3 and R3', connected in series between the output end 32 and ground. The protection circuit 34 retrieves a third detection signal V3 from a node between the two third resistors R3 and R3', and the third detection signal V3 varies according to the voltage change of the output end 32. In one embodiment, the third detection signal V3 may be a voltage signal. It is understood that the third detection signal V3 may also be a current signal. In one embodiment, the third detection circuit 37 may be omitted if the protection circuit 34 is not required.

Figure 3:
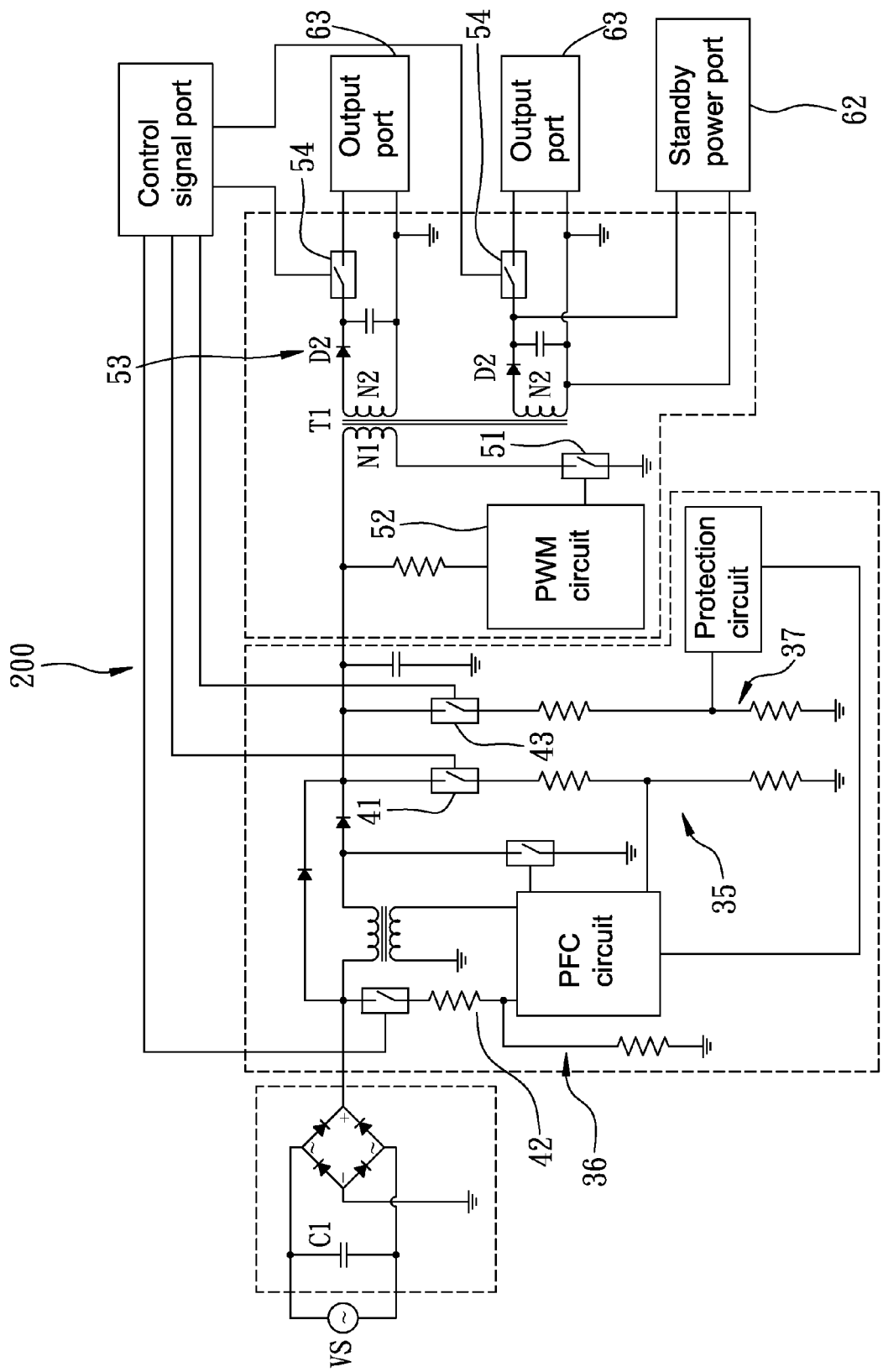
FIG. 3 is a schematic diagram of a second embodiment of a power device as disclosed.

The first, second, third electronic switches 41, 42, 43 are connected to the first, second, third detection circuits 35, 36, 37 in series, respectively. In a first embodiment, the first electronic switch 41 is connected between the two first resistors R1 and R1' of the first detection circuit 35, the second electronic switch 42 is connected between the two second resistors R2 and R2' of the second detection circuit 36, and the third electronic switch 43 is connected between the two third resistors R3 and R3' of the third detection circuit 37. In a second embodiment, as shown in FIG. 3, the first electronic switch 41 is connected between the output end 32 and the first detection circuit 35, the second electronic switch 42 is connected between the input end 31 and the second detection circuit 36, and the third electronic switch 43 is connected between the output end 32 and the third detection circuit 37.

In one embodiment, the electronic switches 41, 42, 43 may be transistors. In a first embodiment, the transistors can be turned on/off by a control end thereof. In a second embodiment, the PFC circuit 33 provides power to the control end of the transistors, thus the transistors can be turned on/off according to the status of the PFC circuit 33.

The output unit 50 includes an output transformer T1 having a primary winding N1 and at least one secondary winding N2, a power switch 51, a pulse width modulation (PWM) circuit 52, at least one second rectifying circuit 53 and at least one output electronic switch 54. The number of the second rectifying circuit 53, the output electronic switch 54, and the secondary winding N2 are the same. In this embodiment, the number of the second rectifying circuit 53, the output electronic switch 54, and the secondary winding N2 are two.

The primary winding N1 of the output transformer T1 receives output power from the power factor unit 30, and the secondary winding N2 is connected to the second rectifying circuit 53. The power switch 51 is connected to the primary winding N1, and is under control of the PWM circuit 52. The second rectifying circuit 53 performs half-wave rectification on power output from the secondary winding N2. In one embodiment, the second rectifying circuit 53 may use a diode D2.

The output electronic switch 54 is connected between the second rectifying circuit 53 and output ports 63, and provides power to loads connected to the output ports 63. The output electronic switch 54 and the electronic switches 41, 42, 43 may be transistors, metal-oxide semiconductors (MOS), or relays. In one embodiment, the number of the output ports 63 and the output electronic switch 54 are also the same.

The control signal port 61 receives control signals from a control device outside of the power device 200, and controls an on/off state of the electronic switches 41, 42, 43 and the output electronic switch 54.

The standby power port 62 receives power output from the second rectifying circuit 53, and provides necessary power to the loads to maintain a sleep state and to awaken the power device 200 and the loads quickly. In one embodiment, the standby power port 62 is connected between the secondary winding N2 and the output electronic switch 54.

When in the standby state, the power device 200 not only denies power to the loads, but also opens the electronic switches 41, 42, 43 by the control signals from the control signal port 61 to deny power to the detection circuit 35, 36, 37. Thus, power loss of the power device 200 in the standby state is further reduced to achieve strict standby power loss standards and comply with power saving criteria.

It is understood that one or two electronic switches may equally achieve standby power loss standard and comply with power saving criteria.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A power device, comprising:
    an input unit comprising a first rectifying circuit to rectify input power;
    a power factor unit comprising an input end to receive the rectified power from the first rectifying circuit, an output end, a power factor correction circuit, and a first detection circuit connected to both the output end and the power factor correction circuit;
    a first electronic switch connected to the first detection circuit in series;
    an output unit comprising an output transformer having a primary winding and at least one secondary winding, a power switch, a pulse width modulation (PWM) circuit and at least one second rectifying circuit, wherein the primary winding receives output power from the power factor unit, wherein the at least one secondary winding is connected to the at least one second rectifying circuit, and the power switch is connected to the primary winding and is under control of the PWM circuit; and
    a control signal port to control an on/off state of the first electronic switch;
    wherein when the power device is in a standby state, the control signal port controls the first electronic switch off to deny power to the first detection circuit.

2. The power device of claim 1, wherein the first detection circuit comprises two first resistors connected in series between the output end of the power factor unit and ground, wherein the power factor correction circuit retrieves a first detection signal from a node between the two first resistors, the first detection signal varying according to a voltage change of the output end of the power factor unit.

3. The power device of claim 2, wherein the first electronic switch is connected between the two first resistors.

4. The power device of claim 2, wherein the first electronic switch is connected between the output end of the power factor unit and the first detection circuit.

5. The power device of claim 1, wherein the power factor unit further comprises a second detection circuit connected to both the input end of the power factor unit and the power factor correction circuit.

6. The power device of claim 5, further comprising a second electronic switch connected to the second detection circuit.

7. The power device of claim 6, wherein the control signal port further controls an on/off state of the second electronic switch.

8. The power device of claim 6, wherein the second detection circuit comprises two second resistors connected in series between the input end of the power factor unit and ground, wherein the power factor correction circuit retrieves a second detection signal from a node between the two second resistors, the second detection signal varying according to a voltage change of the input end of the power factor unit.

9. The power device of claim 8, wherein the second electronic switch is connected between the two second resistors.

10. The power device of claim 8, wherein the second electronic switch is connected between the input end of the power factor unit and the second detection circuit.

11. The power device of claim 1, wherein the power factor unit further comprises a protection circuit connected to the power factor correction circuit and a third detection circuit connected to the output end of the power factor unit and the protection circuit.

12. The power device of claim 11, further comprising a third electronic switch connected to the third detection circuit.

13. The power device of claim 12, wherein the control signal port further controls an on/off state of the third electronic switch.

14. The power device of claim 12, wherein the third detection circuit comprises two third resistors connected in series between the output end of the power factor unit and ground, wherein the protection circuit retrieves a third detection signal from a node between the two third resistors, the third detection signal varying according to a voltage change of the output end of the power factor unit.

15. The power device of claim 14, wherein the third electronic switch is connected between the two third resistors.

16. The power device of claim 14, wherein the third electronic switch is connected between the output end of the power factor unit and the third detection circuit.

17. The power device of claim 1, further comprising a standby power port to receive power output from one of the at least one second rectifying circuit.

18. The power device of claim 17, wherein the output unit further comprises at least one output electronic switch connected between the at least one second rectifying circuit and at least one output port of the power device, and the control signal port further controls an on/off state of the at least one output electronic switch.

* * * * *